(12) United States Patent
Gamache

(10) Patent No.: US 11,116,191 B2
(45) Date of Patent: Sep. 14, 2021

(54) BAIT SLEEVE

(71) Applicant: INOTEV INC., Adstock (CA)

(72) Inventor: Yves Gamache, Adstock (CA)

(73) Assignee: INOTEV INC., Adstock (CA)

( * ) Notice: Subject to any disclaimer, the term of this patent is extended or adjusted under 35 U.S.C. 154(b) by 177 days.

(21) Appl. No.: 16/133,884

(22) Filed: Sep. 18, 2018

(65) Prior Publication Data

US 2019/0082667 A1 Mar. 21, 2019

Related U.S. Application Data

(60) Provisional application No. 62/559,674, filed on Sep. 18, 2017.

(51) Int. Cl.
| | | |
|---|---|---|
| *A01K 85/16* | (2006.01) | |
| *A01K 83/06* | (2006.01) | |
| *A01K 85/01* | (2006.01) | |

(52) U.S. Cl.
CPC .............. *A01K 83/06* (2013.01); *A01K 85/01* (2013.01); *A01K 85/16* (2013.01)

(58) Field of Classification Search
CPC ........ A01K 85/00; A01K 85/02; A01K 85/16; A01K 85/18; A01K 83/06
USPC ......................................... 43/41, 44.2, 44.4
See application file for complete search history.

(56) References Cited

U.S. PATENT DOCUMENTS

| | | | | |
|---|---|---|---|---|
| 556,494 | A * | 3/1896 | Dales | A01K 83/06 |
| | | | | 43/41 |
| 2,216,929 | A * | 10/1940 | Jefferson | A01K 85/16 |
| | | | | 43/42.24 |
| 2,607,155 | A | 8/1952 | Van Der Clute | |
| 2,828,571 | A * | 4/1958 | Caplan | A01K 83/06 |
| | | | | 43/41 |
| 2,839,866 | A * | 6/1958 | Jay | A01K 83/06 |
| | | | | 43/41 |
| 2,904,436 | A | 9/1959 | Auerbach | |
| 3,513,668 | A | 5/1970 | Mintz | |
| 3,844,060 | A | 10/1974 | Kurachi | |
| 4,823,499 | A | 4/1989 | Bissonnett et al. | |
| 4,841,664 | A * | 6/1989 | Baldwin | A01K 85/16 |
| | | | | 43/41 |

(Continued)

FOREIGN PATENT DOCUMENTS

| | | |
|---|---|---|
| CA | 2428838 C | 8/2005 |
| EP | 0937390 A2 | 1/1999 |

(Continued)

*Primary Examiner* — David J Parsley
(74) *Attorney, Agent, or Firm* — Sand, Sebolt & Wernow Co., LPA

(57) ABSTRACT

A bait sleeve for securing a bait therein is disclosed. The bait sleeve includes a sleeve including a first end, and a second stretchable end opposite the first end. The second stretchable end defines an opening into the sleeve, wherein the second stretchable end is stretchable between an open state to receive the bait within the sleeve and a substantially closed state to secure the bait within the sleeve. The bait sleeve also includes a shape-defining frame connected to the sleeve, the shape-defining frame extending between the first end and the second stretchable end. The bait sleeve also includes at least one fishing hook. Advantageously, the frame prevents excessive compression of the bait by the sleeve.

16 Claims, 8 Drawing Sheets

(56) References Cited

U.S. PATENT DOCUMENTS

| | | | | |
|---|---|---|---|---|
| 4,848,023 A | * | 7/1989 | Ryder | A01K 83/06 43/44.2 |
| 4,961,280 A | * | 10/1990 | Hudson | A01K 83/06 43/41 |
| 6,871,442 B2 | * | 3/2005 | Wyatt | A01K 83/06 43/41 |
| 2003/0037479 A1 | | 2/2003 | Wyatt | |
| 2005/0268525 A1 | | 12/2005 | Kalazich | |
| 2012/0055316 A1 | * | 3/2012 | Smith | A01K 85/00 84/404 |
| 2016/0157472 A1 | | 6/2016 | Neal | |

FOREIGN PATENT DOCUMENTS

| | | | |
|---|---|---|---|
| FR | 2267035 | A1 | 8/1976 |
| WO | 8606251 | A1 | 11/1986 |

\* cited by examiner

BAIT SLEEVE

CROSS REFERENCE TO RELATED APPLICATION

This application claims priority from U.S. Provisional Application Ser. No. 62/559,674, filed Sep. 18, 2017, the disclosure of which is incorporated herein by reference.

TECHNICAL FIELD

The present invention generally relates to fishing accessories. In particular, the present invention relates to a bait jacket or bait sleeve.

BACKGROUND

Fishing for recreational or commercial purposes generally employs the tried and tested technique of deploying a baited hook attached to a fishing line into the water for a fish, attracted to the bait, to be caught by the hook when attempting to swallow the bait. Generally, hooks may be baited with portions of fish, worms, or other living bait, or otherwise, so as to entice the fish to bite the baited hook. Sizes and types of bait used may vary depending on the type of fish desired to be caught.

One drawback of baiting a hook is that the bait can easily become dislodged from the hook when the hook is deployed in rough or turbulent waters, or during casting due to the single point of attachment between the hook and the bait. Furthermore, such baited hooks provide opportunities for fish to pick at exposed portions of the bait, causing large portions of the bait to become dislodged from the hook without the fish ever biting the hook. Still, furthermore, different types of bait of varying sizes and integrity may not be conducive to being secured to a hook, which may lead to the bait being easily removed from the hook.

Existing bait jackets, which secure the bait in a sleeve, such as a net, are known to be employed to prevent the bait from being dislodged from the hook. However, one drawback of such bait jackets is that they cannot accommodate bait of varying sizes. Bait of smaller sizes can thus become unsecured from the bait jacket. Also, such bait jackets employ an uncontrolled compressive force on the bait, which tends to slice into the bait, thereby accelerating disintegration of the bait.

Existing bait jackets can also be used with frozen bait. These jackets can be used to keep the frozen bait from scattering in deep or rough water. For example, U.S. Pat. No. 4,823,499 describes bait for fish supported in an elastic casing. However, the elastic casing can overly compress the bait.

Accordingly, there is a need for a bait jacket, excluding one or more of the drawbacks of the above bait jackets; for instance, a bait jacket that can accommodate bait of various sizes and shapes, without imparting an overly compressive force to the bait.

SUMMARY

According to one aspect, the present application relates to a bait sleeve for securing a bait therein, the bait sleeve includes:
a sleeve comprising:
  a first end; and
  a second stretchable end, opposite the first end, the second stretchable end defining an opening in the sleeve, wherein the second stretchable end is stretchable between an open state to receive the bait within the sleeve and a substantially closed state to secure the bait within the sleeve;
a shape-defining frame for receiving the sleeve thereon, the shape-defining frame extending between the first end and the second stretchable end, the frame preventing excessive compression of the bait by the sleeve; and
at least one fishing hook operatively connected to the sleeve or frame.

DETAILED DESCRIPTION

Figure 1:
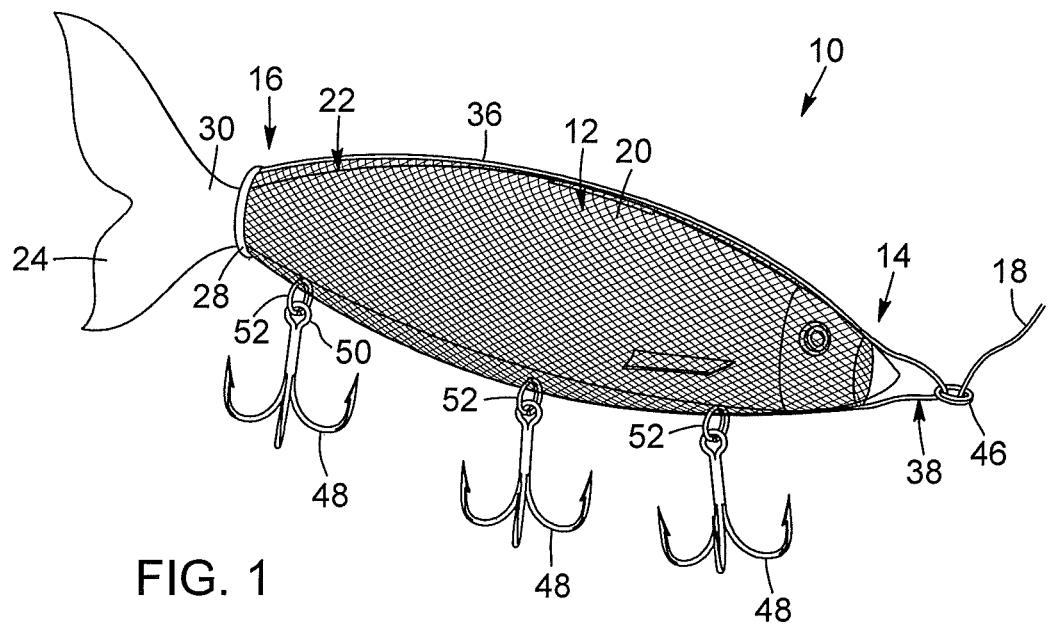
FIG. 1 is a perspective view of a bait sleeve, in accordance with an illustrative embodiment of the present invention.

Now referring to FIG. 1, a bait sleeve for securing a bait therein is illustrated using reference numeral 10. The bait sleeve 10 may have a fish shape. The bait sleeve 10 may be employed to retain a bait for attracting and catching predatory fish, for example trout, pike, perch, kingfish, bluefin tuna, blue marlin or other types of fish, when lake or deep-sea fishing, for example.

The bait sleeve 10 includes a sleeve 12 including a first end 14 and a second stretchable end 16. The first end 14 may be connected to a fishing line 18, such as a nylon fishing line or a twisted cable line, as is generally known in the art, which is in turn attached to a tackle and gear, for example a fishing rod (not shown) or other fishing apparatus, which may be positioned from a boat, or a dock for example, above a body of water from which the bait sleeve 10 may be deployed.

The sleeve 12 is illustratively formed from a flexible netting 20, such as a mesh structure, which is formed to create a tubular sleeve or sock-like structure which defines a space 22 into which a bait 24 can be received and maintained therein by the sleeve 12 in a manner which will be illustratively described herein below. The bait 24 may be any type of bait normally associated with fishing and known in the art and may include whole or pieces of a lower quality fish such as menhaden, goggle eyes or threadfin herring, or other types of bait such as squid and grunts. Illustratively, the bait 24 illustrated herein is a whole fish. The bait sleeve 10 may accommodate bait of various sizes and shapes, without imparting an overly compressive force to the bait. The netting 20 illustratively enables water to enter into and flow through its structure to allow the bait 24 to be sensed by a fish or other types of prey in the surrounding waters, by either sight and/or sound when the bait sleeve 10 is deployed, while preventing the bait 24 from escaping therefrom. For example, when the bait sleeve 10 is being deployed in rough waters, or when it is cast using a fishing rod, or when a fish is attempting to dislodge the bait 24 by nibbling thereat.

Figure 2:
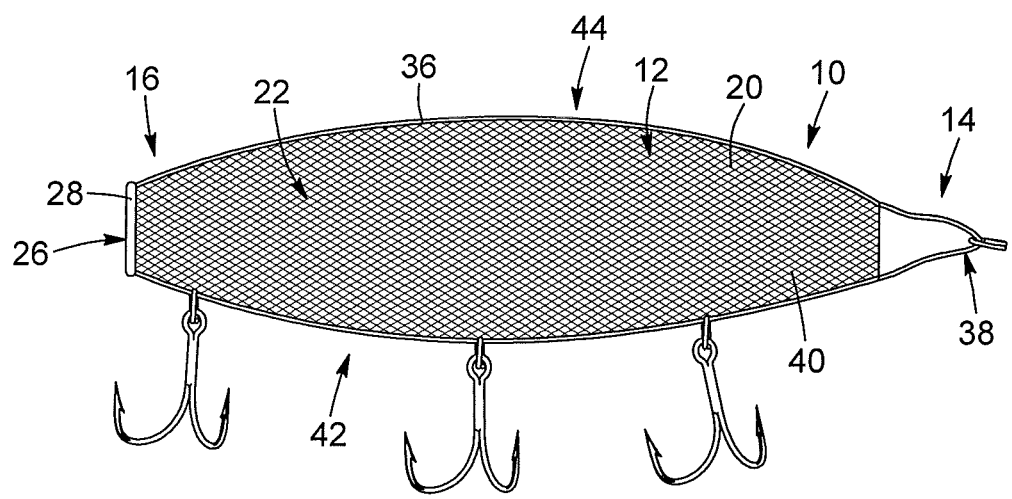
FIG. 2 is a side view of the bait sleeve of FIG. 1, illustrating a substantially closed state of the bait sleeve.
Figure 3:
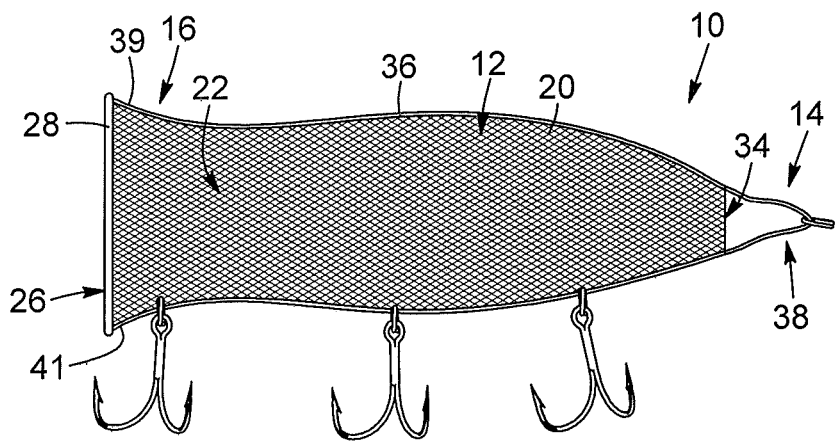
FIG. 3 is a side view of the bait sleeve of FIG. 1, illustrating an open state of the bait sleeve.

Now referring to FIG. 2 and FIG. 3, in addition to FIG. 1, the sleeve 12 is configured to receive and retain the bait 24 therein. The second stretchable end 16 is provided opposite the first end 14 and defines an opening 26 into the sleeve 12 and in communication with the space 22 for inserting the bait 24 into the space 22. The second stretchable end 16 is expandable between a substantially closed state as depicted in FIG. 2, such that the bait 24 may neither be received into the space 22 nor may the bait 24 escape from the confines of the sleeve 12 once the bait 24 has been received within the sleeve 12, and an open state as depicted in FIG. 3 such that the bait 24 may pass through the opening 26 to be received within the sleeve 12. The term "stretchable" is used herein to refer to the ability of an end of the sleeve 12 to expand from the closed state to the open state through a deformation of the end of the sleeve 12 upon an application of a stretching force to the second stretchable end 16, and return to the substantially closed state when such a stretching force is removed. Optionally, the second stretchable end 16 may be resiliently biased so as to return to the closed state, for example by contraction, after it has been stretched to the open state.

Figure 4:
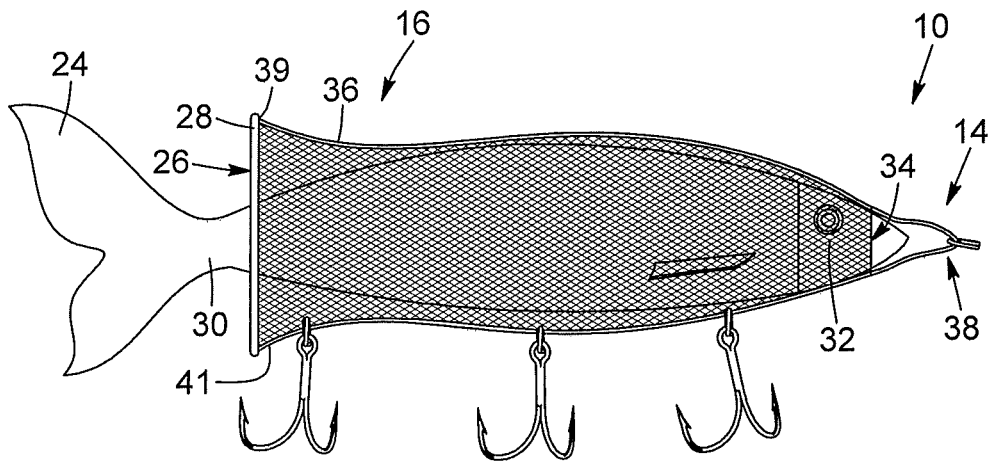
FIG. 4 is a side view of a bait sleeve of FIG. 1, illustrating a bait received within the bait sleeve in an open state.
Figure 5:
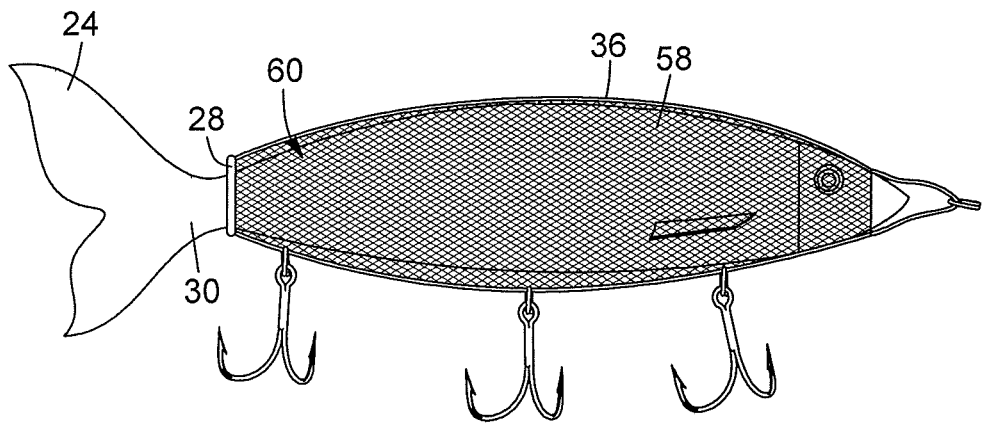
FIG. 5 is a side view of a bait sleeve of FIG. 1, illustrating a bait retained within the bait sleeve in a substantially closed state.

Now referring to FIG. 4 and FIG. 5, in addition to the previous Figures, illustratively, and in accordance with one embodiment of the invention, the second stretchable end 16 may further comprise a stretchable ring 28 that is illustratively circular in form and attached to the netting 20 at about the opening 26. While a circular stretchable ring 28 is illustrated, other shapes, such as oval, may be provided. The stretchable ring 28 may be formed from a ring structure made of rubber, silicon, or other like material, such that it is resiliently biased to maintain the opening 26 in the substantially closed state when not subjected to a stretching force and is stretchable to enlarge the opening 26 to the open state; for example, when applying a stretching force imparted, for example, by the fingers of a user (both not shown), such that the bait 24 may be received there through. When the stretching forces applied to the stretchable ring 28 are removed, the stretchable ring naturally contracts so as to move the opening 26 into a closed state. Illustratively, as shown in FIG. 1 and FIG. 5, when the stretchable ring 28 is in a closed state, it may compressively encircle the tail 30 of the bait 24, projecting from the opening 26. Once the bait 24 is received within the sleeve 12, the head 32 of the bait 24 may illustratively also project from a first opening 34 provided at the first end 14 of the sleeve 12.

Of note, while a resiliently biased stretchable ring 28 has been illustrated herein so as to form the second stretchable end 16, other manners of transitioning between the open state and the substantially closed state of the opening 26 may be provided. For example, a drawstring type configuration or a clamp configuration may also be provided.

Still referring to FIG. 5, the girth of the bait 24 may act to deform or stretch the sleeve 12 on the bait 24 when the bait 24 is received or is being received within the space 22, such that the netting 20 acts to generate a compressive force on the bait 24 to maintain the bait 24 within the confines of the sleeve 12. Also, by applying such a compressive force to the bait 24, the integrity of the bait 24 may be enhanced to ensure and prevent the disintegration of the bait 24, for example during rough waters or from the action of casting. If the bait 24 does disintegrate, the sleeve 12 may further act to maintain dislodged pieces from the bait 24 within the confines of the sleeve 12.

Referring back to FIG. 4, the bait sleeve 10 further includes a shape-defining frame 36 for receiving the sleeve 12 thereon, the shape-defining frame 36 extends between the first end 14 and the second stretchable end 16. For instance, the frame may prevent excessive compression of the bait 24 by the sleeve 12. For example, the shape-defining frame 36 may be adhesively connected or intertwined with the netting 20 and secured to the stretchable ring 28 at two or more positions about the circumference of the stretchable ring 28. Other connection methods are also possible. The shape-defining frame 36 may comprise two or more wire frame sections. For instance, the wire frame sections may be metallic wire frame sections. The two or more wire frame sections may comprise a top frame section 39 and a bottom frame section 41. Illustratively, the shape-defining frame 36 has a substantially oval shape. For example, the shape-defining frame 36 may be formed, for instance, from a single wire that is bent so as to create a fold 38 and a substantially U-shaped frame having a top frame section 39 and a bottom frame section 41, both being connected to the stretchable ring 28 at opposite ends along its circumference. The shape-defining frame 36 may include bends and contours illustratively matching the top and bottom contours of the bait 24 within the vertical plane of the bait 24. Illustratively, the shape-defining frame 36 may be made with a metal wire, but other materials, such as plastic or the like, may be provided instead.

Referring to FIGS. 1 to 5, in such an embodiment, the shape-defining frame 36 causes the netting 20 to form a pair of sidewalls 40, a bottom 42, and a top 44 and adopt a side profile defined by the curves and bends of the shape-defining frame 36. The shape-defining frame 36 may also be flexible such that when the stretchable ring 28 is stretched as described hereinabove, the shape-defining frame 36 about the top frame section 39 and a bottom frame section 41 connected to the stretchable ring 28 may also deflect in response to impart a stretching of the adjacent netting 20 about the second stretchable end 16, as illustrated in FIG. 3. Of note, other configurations of the shape-defining frame 36 may be provided, in addition to other shapes.

The shape-defining frame 36 thus may force the netting 20 to adopt a pre-defined shape, which enables the bait to be more easily received within the sleeve 12 as well as prevents excessive compression of the bait 24 by the sleeve 12. It does this by providing a resilient support structure, which counteracts the compressive force of the netting 20. Providing a shape-defining frame 36 further allows the bait sleeve 10 to be pre-formed to a size which matches the type of bait 24 to be received therein to ensure that the compressive force of the netting is properly distributed over the bait 24, so as to ensure the bait 24 is maintained therein, as well as to facilitate the insertion of the bait 24 into the sleeve by providing an appropriately defined space 22.

Furthermore, the shape-defining frame 36 allows the fishing line 18 to be attached to the first end 14, for example by connecting the fishing line 18 to the shape-defining frame 36 at about the fold 38, for example on a knot 46 created in the wire of the shape-defining frame 36.

The bait sleeve 10 further includes at least one fishing hook 48 operatively connected to the sleeve 12 or shape-defining frame 36. For example, said fishing hook 48 would be connected to the shape-defining frame 36 by an eye 50 of the fishing hook 48 and connected to hook rings 52, that are in turn connected to the shape-defining frame 36, for example. For example, hook rings may be provided on the shape-defining frame 36, at the bottom 42 or top 44 of the netting 12. For example, the at least one fishing hook 48 may be provided at or near the first end 14 of the sleeve 12. The fishing hook 48 is used to hook the fish on the fishing hook 48 after having been lured by the bait 24 maintained within the sleeve 12 and after the fish has attempted to swallow the bait sleeve 10 or part of the bait sleeve 10. Optionally, more than one fishing hook 48 may be connected to the shape-defining frame 36. Illustratively, treble hooks are shown, but other types of hooks may be provided, depending on the application or type of fish desired to be caught.

To further assist with the luring of fish to the bait sleeve 10, the sleeve 12 may be impregnated with fish-attracting odour 58. Optionally, the netting can be made of a porous material, that can absorb an odorant solution that attracts fish. The entire bait sleeve 10 can be immersed in an odorant solution, or only portions thereof. Alternatively, the source of fish-attracting odour 58 operatively connected to the bait sleeve 10 may be provided. Optionally, a source of fish-attracting vibrations 60 could also be operatively connected to the bait sleeve 10.

Figure 6:
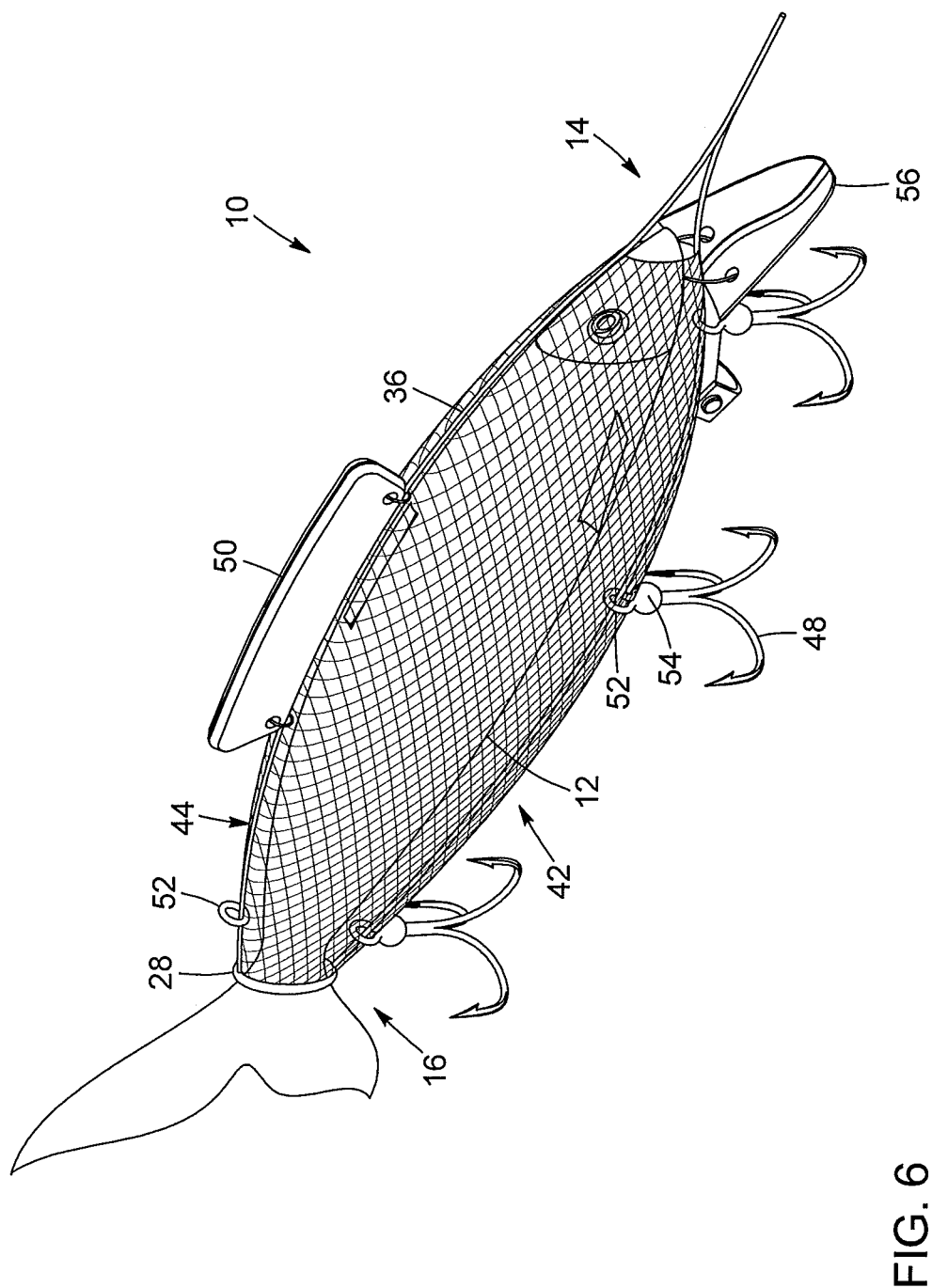
FIG. 6 is a perspective view of a bait sleeve, in accordance with another illustrative embodiment of the invention.

Referring to FIG. 6, in addition to the previous Figures, another possible embodiment of a bait sleeve 10 is shown. The bait sleeve 10 in FIG. 6 is similar to the one illustrated in the previous Figures, and includes a first end 14 and a second stretchable end 16. Similarly to the previous embodiment, the second stretchable end 16 may be further provided with a stretchable ring 28. Likewise, the bait sleeve 10 includes a sleeve 12, and a shape-defining frame 36 for receiving the sleeve 12 thereon. For instance, the frame may prevent excessive compression of the bait by the sleeve 12.

In this embodiment, the bait sleeve 10 further comprises a fin 50, preferably provided at the top of the netting 20. In the present illustration, the fin is attached to the shape-defining frame 36, but other configurations are also possible. The fin 50 may be, for example, made of foam, such as polystyrene or other similar material, which can be buoyant or not. When in use, the fin may, for instance, vibrate as the bait sleeve 10 is pulled in the water, which may attract fish. For example, the fin may be made of a colored or reflective material, to further catch the attention of a fish or other prey. In a possible configuration, the fin 50 can have an undulated shape, such that the bait sleeve 10 would oscillate from left to right in a way that is relative to the travel direction. Preferably, one or more incisions or cavities can be provided in the fin, so as to allow insertion or injection of a fish-attracting odorous liquid or gel within the fin. Other means of infusing the fin 50 with a fish-attracting odorous liquid or gel are also considered.

Still referring to FIG. 6, in addition to the previous Figures, the bait sleeve 10 can include a mouth or front plate 56, preferably provided at or near the first end 14. The mouth or front plate 56 illustratively has a substantially curved and conical shape, causing the bait sleeve to oscillate when pulled through the water, to further catch the fishes' or other preys' attention. The mouth or front plate 56 preferably has a free front end, which is narrower than the back end. The back end of the mouth or front plate 56 is preferably affixed to the shape-defining frame 36, but other configurations are also possible. In addition, one or more weights 54 may further be provided at or near the bottom of the shape-defining frame 36. Weights may be added or removed to control the depth at which the bait sleeve 10 will be immersed in the water. In the illustrated embodiment, the weights 54 are provided on the hooks 48, but other configurations are possible. Hook rings 52 may be provided on both sides (top 44 and/or bottom 42 sides) of the sleeve 12, attached to the shape-defining frame 36, to affix, for example, weights, fishing hooks, flies or other fishing accessories. Optionally, to further assist with the luring of fish to the bait sleeve 10, at least one of the fin 50 and sleeve 12 may be impregnated with fish-attracting odour 58.

Figure 7:
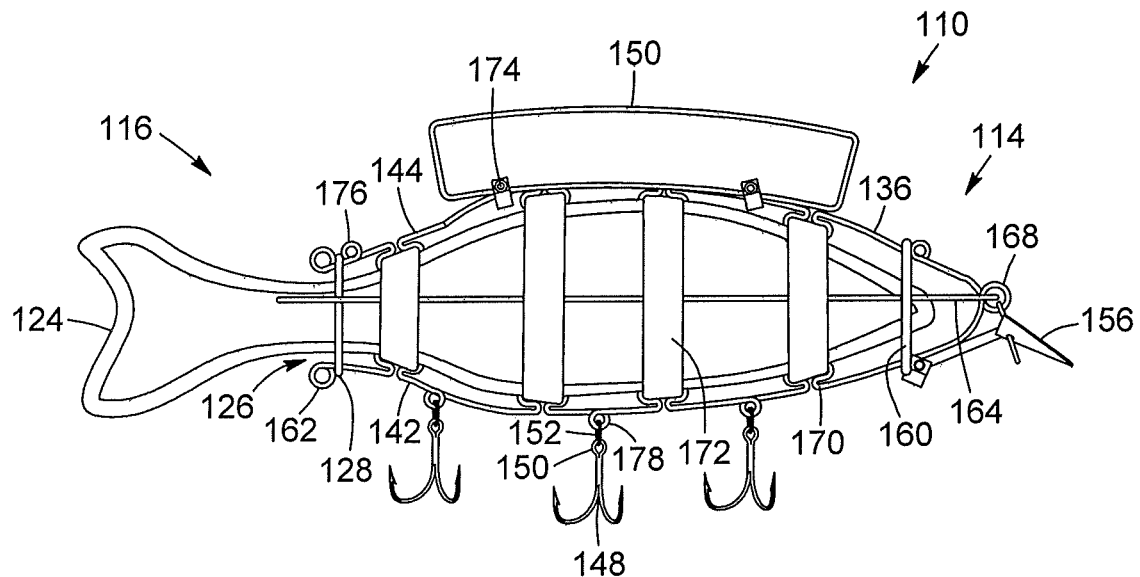
FIG. 7 is a side view of a bait sleeve in accordance with another illustrative embodiment of the invention.

Referring to FIG. 7, in addition to the previous Figures, another possible embodiment of a bait sleeve 110 is depicted. The bait sleeve 110 in FIG. 7, similar to the one illustrated in the previous Figures, includes a first end 114 and a second stretchable end 116, which may also be referred to as front 114 and rear ends 116. In this embodiment, in addition to a stretchable ring 128 at the second stretchable end 116, there is also provided a stretchable ring 160 at the first end 114. Therefore, in this embodiment, the first end 114 of the sleeve may also be stretchable. The stretchable rings 128 and 160 may be used to tighten and secure a bait 124 in place at each ends of the bait sleeve 110. For example, the stretchable rings 128 and 160 may each be maintained in position by two loops or knots 162 bent in the wire of a shape-defining frame 136. The bait 124 may still be inserted through an opening 126 at the second stretchable end 116 of the bait sleeve 110. The shape-defining frame 136 may be made of a metal wire, but other materials, such as plastic or the like, may also be provided.

Still referring to FIG. 7, the bait sleeve 110 according to this embodiment also further includes a shape-defining frame 136 for receiving the sleeve 112 thereon, the shape-defining frame 136 extends between the first end 114 and the second stretchable end 116. For instance, the frame may prevent excessive compression of the bait 124 by the sleeve 112. Illustratively, the shape-defining frame 136 comprise two or more wire frame sections, the two or more wire frame sections comprises a top frame section 144 and a bottom frame section 142 and may further comprise a left frame section 166 and a right frame section 164. For example, the wire frame sections may be metallic wire frame sections. Illustratively, the shape-defining frame 136 may have a substantially oval shape. In this case, the shape-defining frame 136 may include two wires bent in two substantially U-shaped frame sections. For instance, the two wires are attached at an angle, and preferably perpendicularly, to each other at the first end 114, forming a top frame section 144, a bottom frame section 142, a right frame section 164 and a left frame section 166 (not shown in FIG. 7). The stretchable rings 128 and 160 are thus preferably in contact with the shape-defining frame 136 at four opposite points (0, 90, 180 and) 270° along their circumference. The second U-shaped wire that composes the right frame section 164 and the left frame section 166 may, for example, be passed through a front knot 168, at the first end 114, bent in the wire of the shape-defining frame 136, to further secure them together. The shape-defining frame 136 may also include bends and contours illustratively matching the top, bottom, right and left contours of bait 124 within the vertical and horizontal plane of the bait 124.

Still referring to FIG. 7, the sleeve 112 comprises a plurality of elastomeric bands 172 extending around at least two opposed ones of the wire frame sections of the shape-defining frame 136. Illustratively the top frame section 144 and bottom frame section 142 may be bent in a way so as to create several grooves or channels to form paths 170. For instance, in FIG. 7, there are four pairs of grooves. These grooves at the top frame section 144 and bottom frame section 142 are preferably aligned, the paths 170 formed by these grooves may each receive an elastomeric band 172. The elastomeric bands 172 are installed in the paths 170 located in a pair of grooves. While a circular or annual elastomeric band 172 is illustrated, other shapes, such as oval, may be provided.

Along with the shape-defining frame 136 and the stretchable rings 128 and 160, the elastomeric bands 172 are used to secure the external component of the bait 124 and hold the right frame section 164 and the left frame section 166 of the shape-defining frame 136. The bait sleeve 110 may accommodate bait of various sizes and shapes, without imparting an overly compressive force to the bait. While elastomeric bands 172 made of rubber are preferred, other types of elastomeric material may be used. The elastomeric bands 172 typically have an annular body and have a thickness that allows them to be inserted with the grooves/channels formed in the metal frames. While in the illustrated embodiment, the top frame section 144 and bottom frame section 142 are provided with the grooves, they could also be provided on the right frame section 164 and left frame section 166.

Still referring to FIG. 7, in this embodiment, similar to the one illustrated in FIG. 6, the bait sleeve 110 may further comprise a fin 150, which may be affixed to the shape-defining frame 136, preferably to the top frame section 144 with, for example, a system of plastic clips 174 to knots bent in the shape-defining frame 136. Also, similar to the embodiment illustrated in FIG. 6, the bait sleeve 110 may further include a mouth or front plate 156, located at the first end 114 and affixed, for instance, to the shape-defining frame 136 and to the front knot 168. The front knot 168 like in the previous Figures, may also be used to attach a nylon fishing line or a twisted cable line (not shown in FIG. 7), as is generally known in the art, which is, in turn, attached to a tackle and gear, for example a fishing rod (not shown in FIG. 7) or other fishing apparatus, which may be positioned from a boat, or a dock, for example, above a body of water from which the bait sleeve 110 may be deployed. The bait sleeve 110 may optionally include a knot 176, bent in the wire of the shape-defining frame 136, located at the second stretchable end 116, to secure a chapelet or any other type of fishing lures known in the art. The bait sleeve 110 further includes at least one fishing hook 148 operatively connected to the sleeve 112 or shape-defining frame 136. For example, the at least one fishing hook 148 may be provided at or near the first end 114 of the sleeve 112, for instance, connected to the shape-defining frame 136 by an eye 150 of the fishing hook 148 attached to a hook ring 152, which, for example, may be attached to one of the knots 178 on the shape-defining frame 136. Preferably, the knots 178 can be positioned on the bottom frame section 142 of the shape-defining frame 136. The knots may be provided by bending the wire of the shape-defining frame 136. The fishing hook 148 is used to hook a fish or other prey on the fishing hook 148 after having been lured by the bait 124 maintained within the bait sleeve 110 and after the fish or other prey has attempted to swallow the bait sleeve 110 or part of the bait sleeve 110. Optionally, more than one fishing hooks 148 may be attached to the shape-defining frame 136. Illustratively, treble hooks are shown, but other types of hooks may be provided, depending on the application or types of fish or other prey desired to be caught.

Figure 8:
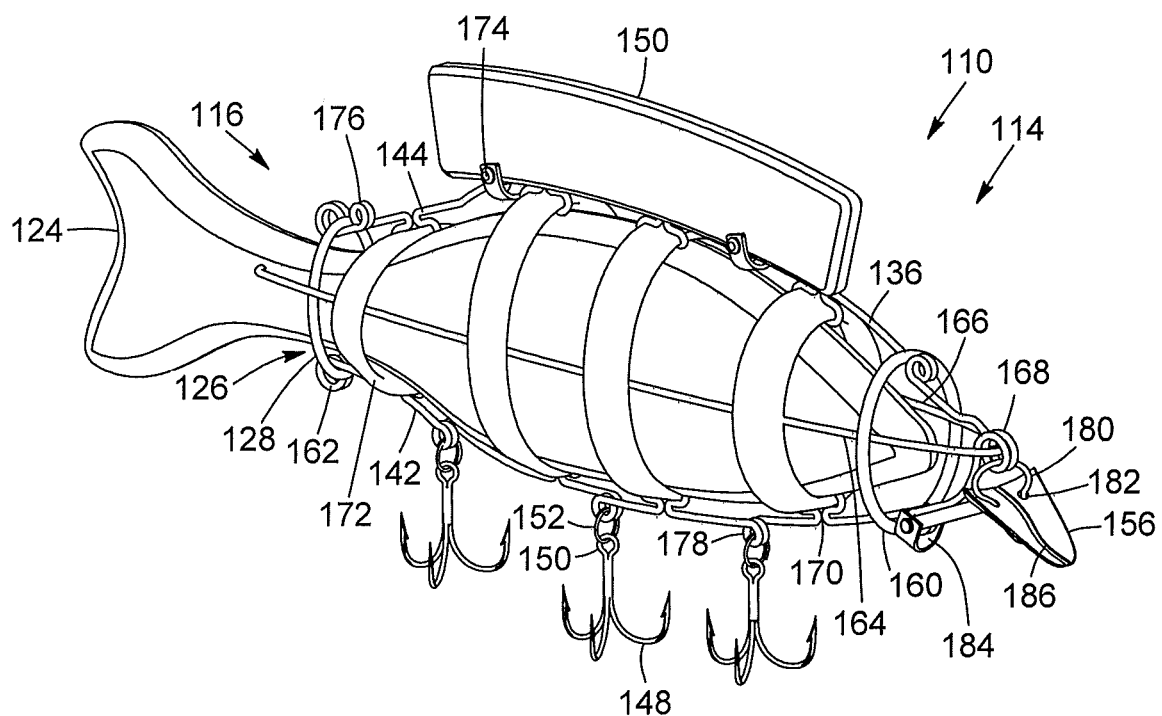
FIG. 8 is a side perspective view of the bait sleeve of FIG. 7, illustrating a bait retained within the bait sleeve.

Referring to FIG. 8, in addition to FIG. 7, the bait sleeve 110 includes a shape-defining frame 136 with a front knot 168 bent in the wire of the shape-defining frame 136 at the first end 114 in which the second U-shaped wire may be inserted. This knot may also be used to attach a fishing line (not shown in FIG. 8) and/or a mouth or front plate 156. The mouth or front plate 156 may, for instance, be used to prevent the bait from coming up to the surface while trolling. Illustratively, the mouth or front plate 156 has a substantially curved and conical shape, causing the bait sleeve 110 to oscillate when pulled through the water, to further catch the fish's or other prey's attention. The mouth or front plate 156 preferably has a free front end, which is narrower than the back end. The back end of the mouth or front plate 156 may be affixed to the shape-defining frame 136 using a metal ring 180. The metal ring 180 may be passed through two apertures 182 on the back of the mouth or front plate 156 and may be attached to the knot 168. Other possible ways to attach the mouth or front plate 156 are also considered. To further secure the mouth or front plate 156, a plastic clip 184 may also be used, but other configurations are possible. Illustratively, the mouth or front plate 156 may further include a wavy groove 186 to make the sleeve bait 110 undulate from right to left to simulate the real movement of a fish. The mouth or front plate 156 may also cause a vibration when the plate hits on the front knot 168, generating even more interest for the fish or other prey.

Figure 9:
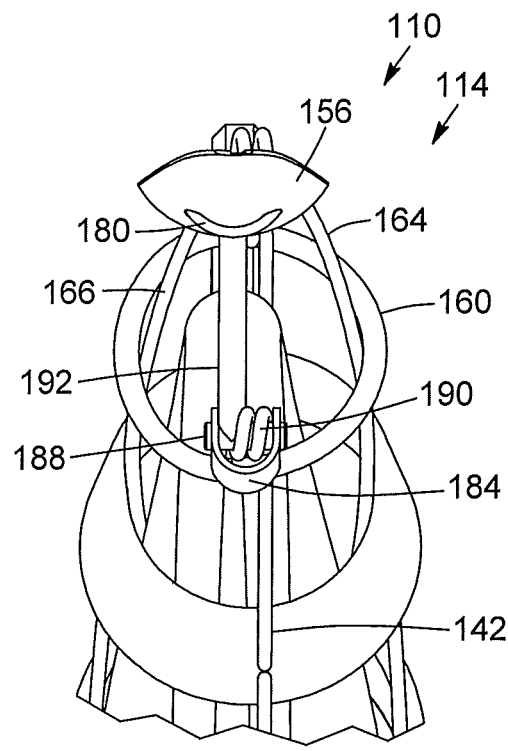
FIG. 9 is a perspective view of a portion of the bait sleeve of FIG. 7, illustrating a bait retained within the bait sleeve, from the first end view.

Referring to FIG. 9, in addition to FIGS. 7 and 8, the bait sleeve 110 may further include a clip system 184 which secures the mouth or front plate 156 in place. The clip system 184 may comprise a cylinder 188, which may pass through a knot 190 bent in the wire of the shape-defining frame 136 at the first end 114 on the bottom frame section 142, which may already hold the stretchable rings 160. The cylinder 188 may be perpendicularly attached to a plastic rod 192, which holds the mouth or front plate 156 at an angle to prevent the bait from coming up to the surface while trolling. The cylinder 188 may be maintained in the knot with a plastic clip 184 bent in a U-shape by passing through an aperture at both ends of the clip and clipping it, but other configurations are also possible.

Figure 10:
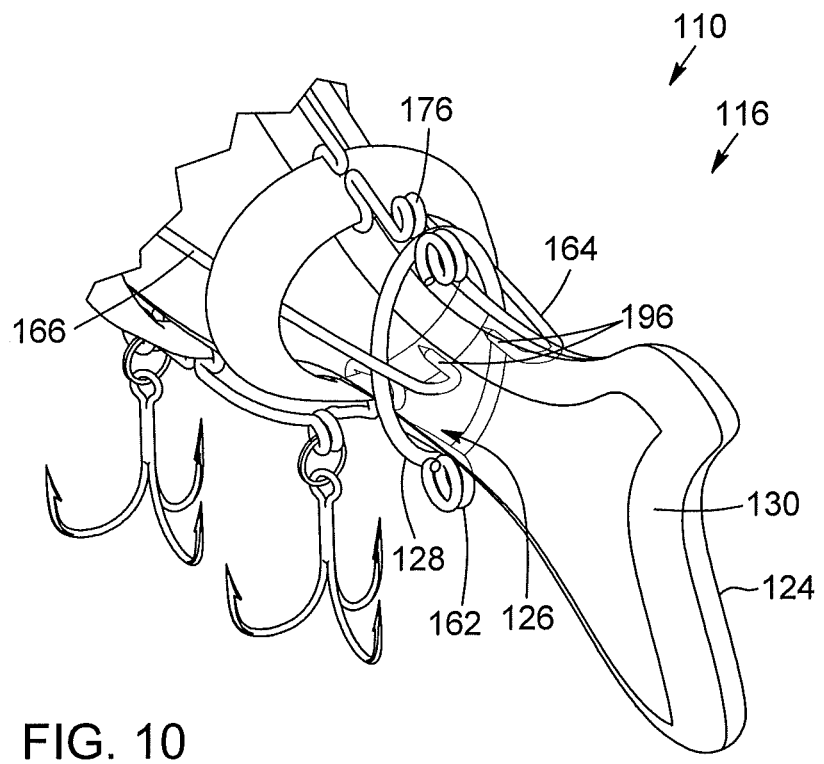
FIG. 10 is a perspective view of a portion of the bait sleeve of FIG. 7, shown from the second stretchable end view.

Referring to FIG. 10, in addition to FIGS. 7 to 9, the right frame section 164 and the left frame section 166 of the shape-defining frame 136 may each include, at the second stretchable end 116, a hook 196 used to maintain the bait 124 in place by the inserting the hooks 196 in the tail 130 of the bait 124.

Figure 11:
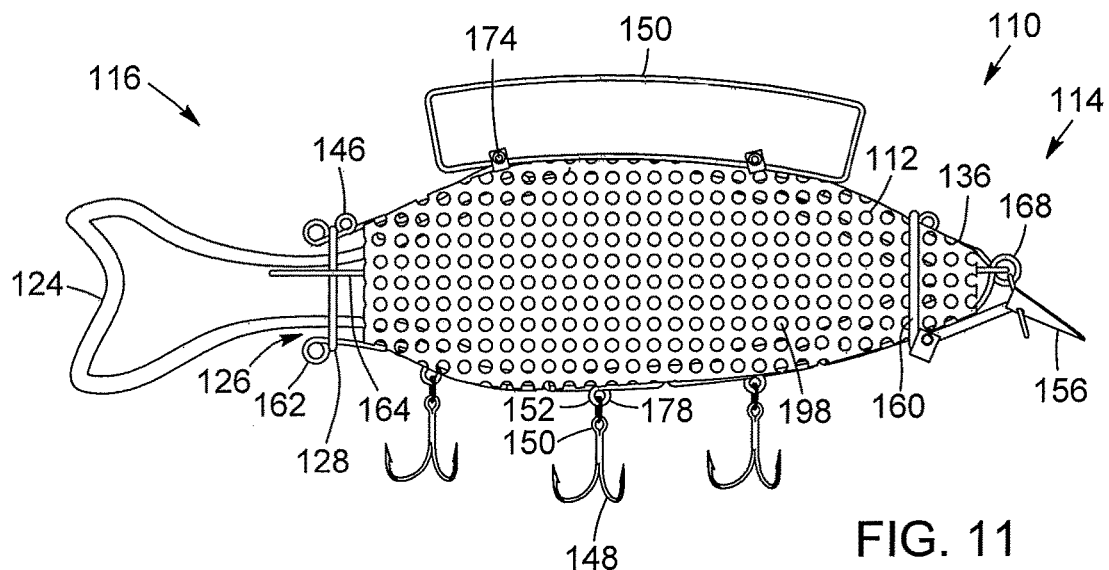
FIG. 11 is a side view of a bait sleeve in accordance with another illustrative embodiment of the invention.

Referring to FIG. 11, in addition to FIGS. 7 to 10, another possible embodiment of the bait sleeve 110 is depicted. The bait sleeve 110 in FIG. 11 is similar to the one illustrated in FIG. 7, and includes a first end 114 and a second stretchable end 116; the two ends being stretchable. Similar to the previous embodiment, both ends may be provided with stretchable rings 128 and 160. Likewise, the bait sleeve 110 includes a shape-defining frame 136, that allows a sleeve 112 to maintain its shape and prevents the sleeve 112 from overly compressing the bait 124. Illustratively, the shape-defining frame 136 may also include two wires bent to form a top frame section 144, a bottom frame section 142, a right frame section 164 and a left frame section 166, all of which are affixed like in the embodiment illustrated in FIG. 7. Likewise, this embodiment may also further comprise a front knot 168, which may be used as an attachment point for the two shape-defining frame wires 136, the fishing line (not shown in FIG. 11), and the mouth or front plate 156.

Still referring to FIG. 11, in this embodiment, the sleeve 112 comprises a plastic net 198. The plastic netting 198 illustratively enables water to enter into and flow through its mesh structure to allow the bait 124 to be sensed by a fish, or other type of prey, in the surrounding waters by either sight and/or sound when the bait sleeve 110 is deployed. The plastic net 198 may also be used to maintain dislodged pieces and external components from the bait 124 within the confines of the bait sleeve 110. The bait sleeve 110 may accommodate bait of various sizes and shapes, without imparting an overly compressive force to the bait. Like in the previous embodiments, optionally, at least one of the fin 150 or sleeve 112 may be impregnated with fish-attracting odour 58 to further assist with the luring of fish to the bait sleeve 110. Alternatively the source of fish-attracting odour 58 may be inserted into the plastic net 198. The plastic net 198 can mold and be one piece or several pieces clipped together. The plastic net 198 may optionally be affixed to the shape-defining frame 136 by passing the wires of the frame 136 through the mesh of the plastic net 198. Other configurations may be provided. In this embodiment, the stretchable ring 160 may be placed over the plastic net 198 but other configurations are possible.

Still referring to FIG. 11, similar to the one illustrated in previous Figures, the bait sleeve 110 may further comprise a fin 150, which may be affixed to the shape-defining frame 136, preferably to the top frame section 144 with a system of plastic clips 174. Also, similar to the one illustrated in previous Figures, the bait sleeve 110 may further include a mouth or front plate 156, at the first end 114 affixed to the shape-defining frame 136. The front knot 168 may also be present in this embodiment and may also be used to attach a fishing line or a twisted cable line (not shown in FIG. 11). The bait sleeve 110 may further include a loop or knot 176 at the second stretchable end 116, to secure a chapelet or any other type of fishing lure known in the art. The bait sleeve 110 further includes at least one fishing hook 148 operatively connected to the sleeve 112 or frame 136. For instance, the at least one fishing hook 148 is provided at or near the first end 114 of the sleeve 112. For instance, the fishing hook 148 may be connected to the shape-defining frame 136, illustratively by an eye 150 of the fishing hook 148 attached to hook rings 152 attached to a knot 178 of the shape-defining frame 136, for example. Preferably, the knots can be provided on the bottom frame section 142. The knots are provided by bending the shape-defining frame 136. The fishing hook 148 is used to hook the fish onto the fishing hook 148 after having been lured by the bait 124, maintained within the bait sleeve 110, and after the fish has attempted to swallow the bait sleeve 110 or part of the bait sleeve. Optionally, more than one fishing hook 148 may be affixed to the shape-defining frame 136. Illustratively, treble hooks are shown, but other types of hooks may be used depending on the application or type of fish desired to be caught.

Figure 12:
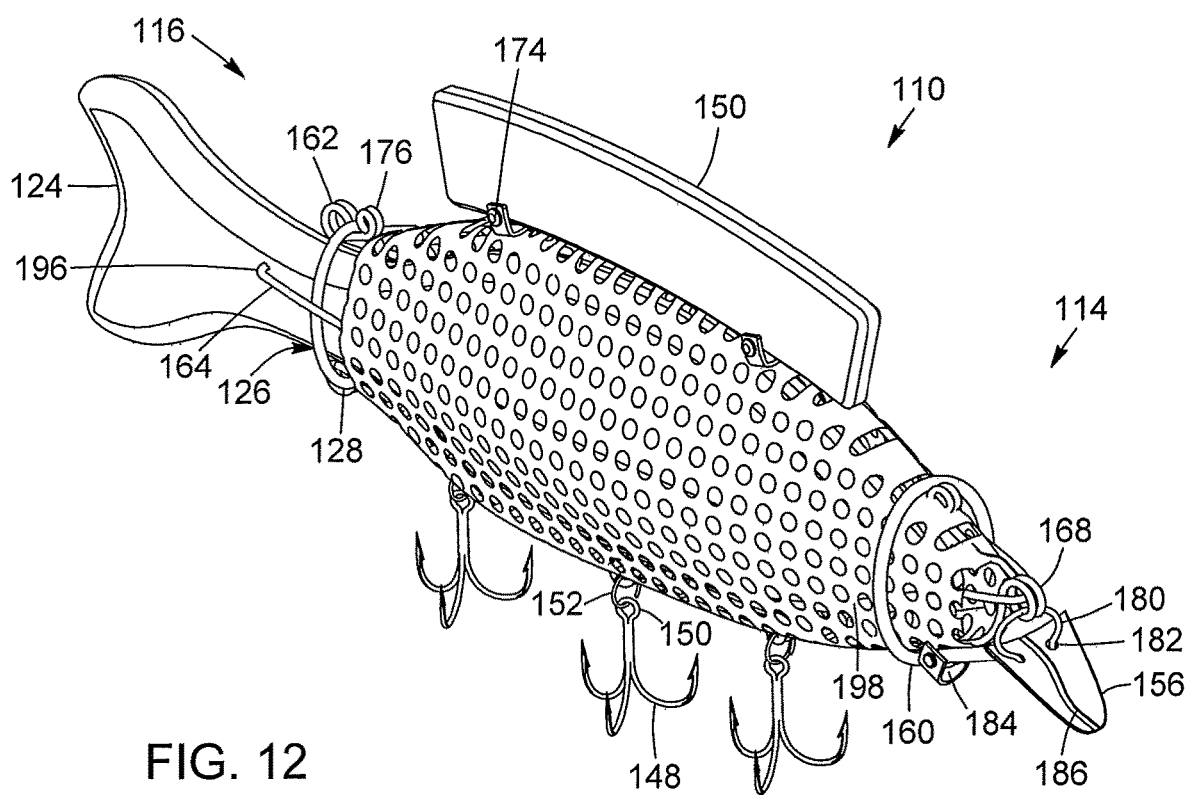
FIG. 12 is a perspective view of the bait sleeve of FIG. 11, illustrating a bait retained within the bait sleeve.

Now referring to FIG. 12, which is a perspective view of the embodiment depicted in FIG. 11, the bait sleeve 110 includes a shape-defining frame 136 which may include a front knot 168 bent into the metal wire, at the first end 114, in which the second U-shaped wire may be inserted. This knot may also be used to connect the bait sleeve 110 to a fishing line (not shown in FIG. 12) and to a mouth or front plate 156. The mouth or front plate 156 may be used to prevent the bait from coming up to the surface while trolling. Illustratively, the mouth or front plate 156 has a substantially curved and conical shape, causing the bait sleeve 110 to oscillate when pulled through the water, to further catch the fish's or other prey's attention. The mouth or front plate 156, preferably, has a free front end, which is narrower than the back end of the mouth or front plate 156. The back end of the mouth or front plate 156 may be affixed to the shape-defining frame 136 using a metal ring 180. The metal ring 180 may be passed through two apertures 182 on the back of the mouth or front plate 156 and attached to a front knot 168. To further secure the mouth or front plate 156, a plastic clip 184 may also be used, but other configurations are possible. The plate 156 may further include a wavy groove 186 to make the sleeve bait 110 undulate from left to right to simulate the real movement of a fish. The mouth or front plate 156 may also cause a vibration when the mouth or front plate 156 hits the front knot 168, which may effectively generate interest for the fish. Illustratively, the bait sleeve 110 may further include a plastic clip system 184 which holds the mouth or front plate 156 in place. The plastic clip system 184 may comprise a cylinder 188, which is passed through a knot 190 on the shape-defining frame 136, at the first end 114 and on the bottom frame section 142, which already holds the stretchable rings 160. The cylinder 188 may be perpendicularly attached to a plastic rod 192 which holds the mouth plate 156 at an angle to prevent the bait from coming up to the surface while trolling. The cylinder 188 is maintained in the knot with a plastic clip 184 that is bent into a U-shape by passing through an aperture at both ends of the plastic clip 184.

Still referring to FIG. 12, in this embodiment, similar to the one illustrated in FIG. 10, the right frame section 164 and the left frame section 166 of the shape-defining frame 136 may, optionally, each include, at the second stretchable end 116, a hook 196 used to maintain the bait 124 in place by inserting the hooks 196 into the tail 130 of the bait 124.

Figure 13:
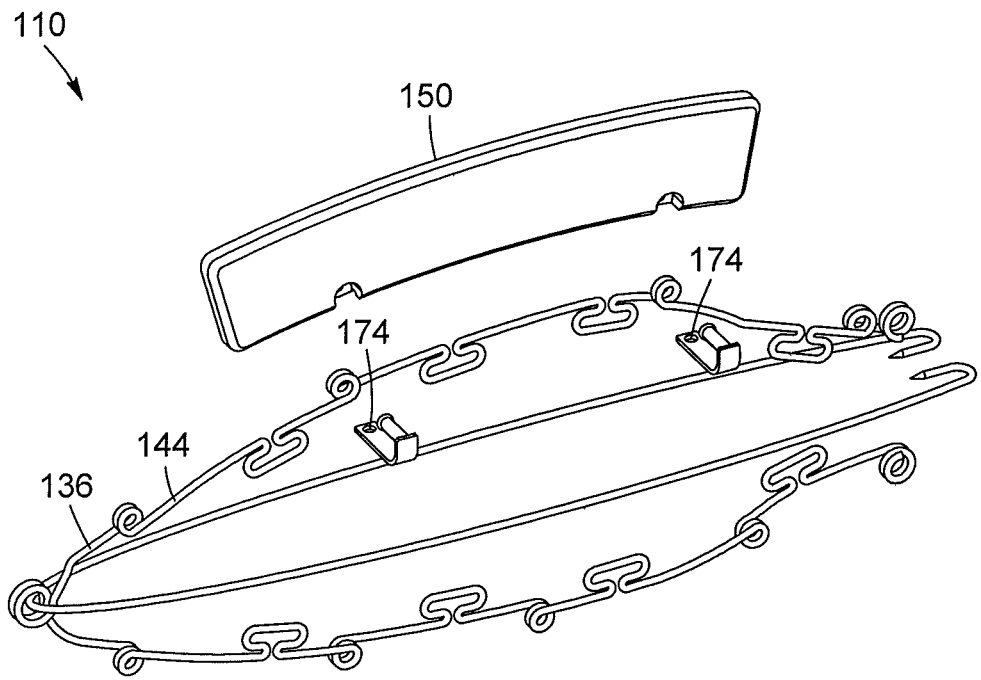
FIG. 13 is a perspective view of the shape-defining frame of the bait sleeve of FIGS. 7 to 12, illustrating the alignment of the fin's two holes with two of the knots on the shape-defining frame.
Figure 14:
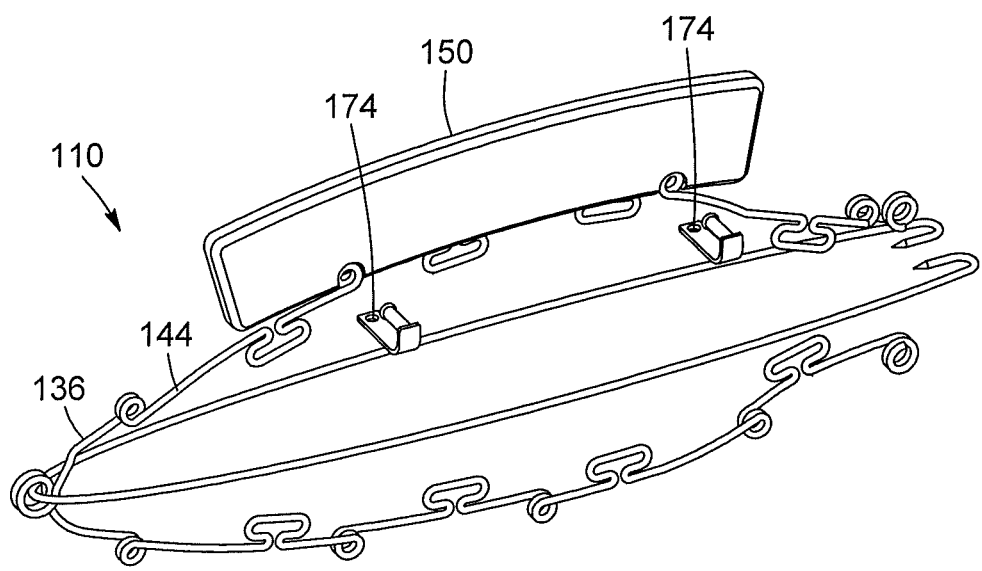
FIG. 14 is a perspective view of the shape-defining frame of the bait sleeve of FIGS. 7 to 12, illustrating the positioning of the fin on the shape-defining frame.
Figure 15:
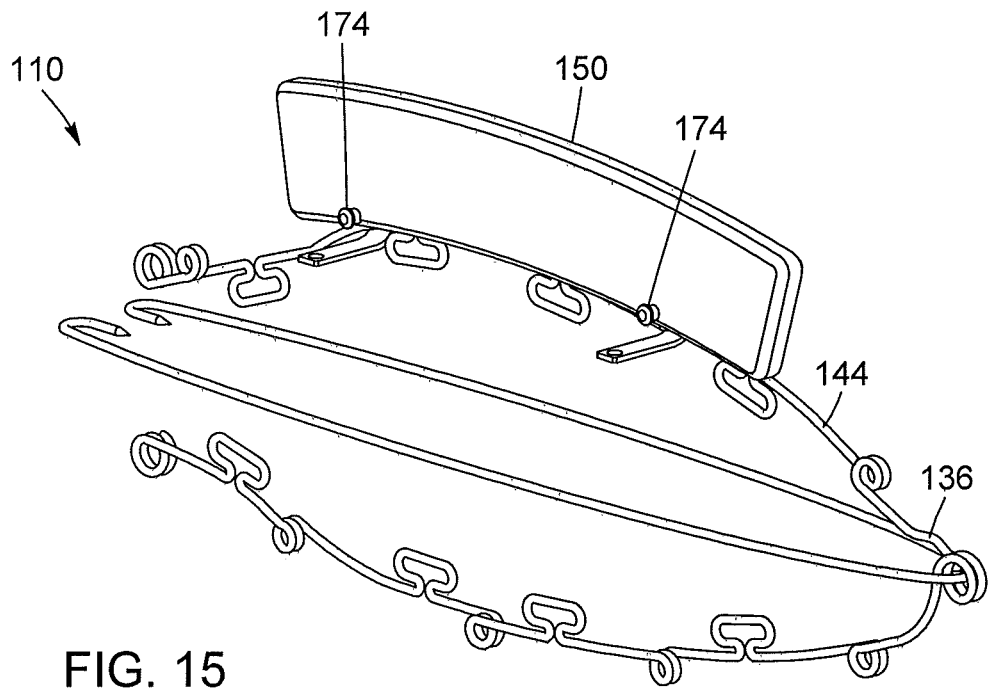
FIG. 15 is a perspective view of the shape-defining frame of the bait sleeve of FIGS. 7 to 12, illustrating the insertion of the plastic clip in the fin's holes and in two of the knots on the shape-defining frame.
Figure 16:
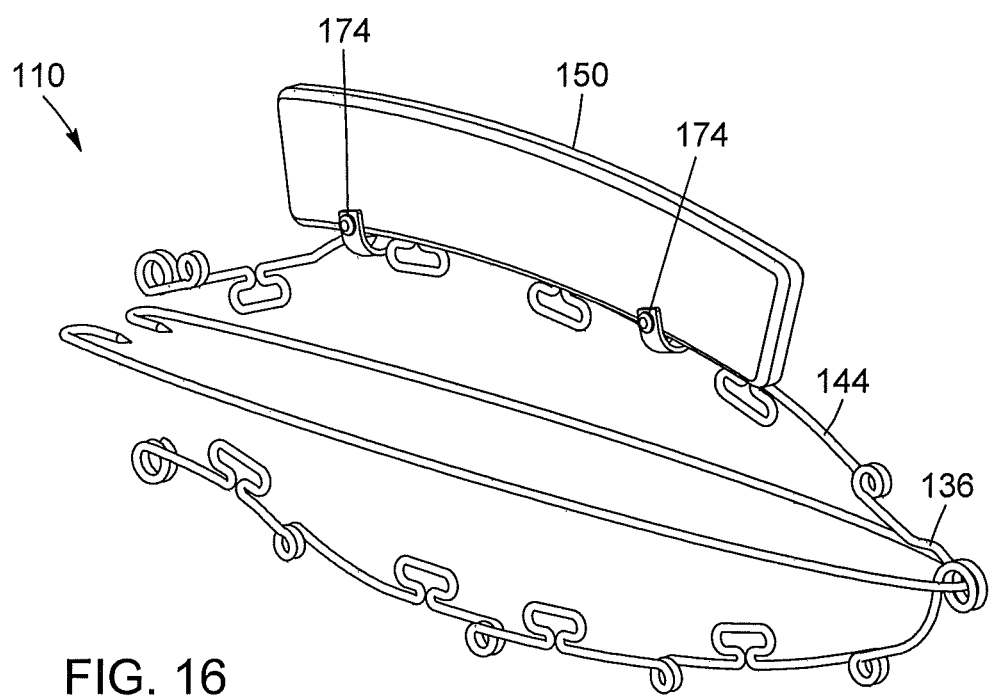
FIG. 16 is a perspective view of the shape-defining frame of the bait sleeve of FIGS. 7 to 12, illustrating the attachment of the fin to the shape-defining frame.

Referring to FIGS. 13 to 16, a perspective view of the shape-defining frame 136 of a bait sleeve 110 is illustrated. Like in the previous embodiments, the fin 150 is attached to the shape-defining frame 136. The fin 150 may include two holes, which may be aligned with two knots on the top frame section 144 of the shape-defining frame 136, as depicted in FIGS. 13 and 14. Illustratively, two plastic clips 174 are passed through the knots and the fin holes, as illustrated in FIG. 15 and clipped to the other side of the fin 150, securing the fin on the shape-defining frame 136, as depicted in FIG. 16. Other manners of securing the fin 150 on the shape-defining frame 136 are also considered.

It will be appreciated from the foregoing disclosure that there is provided a bait sleeve which facilitates the rapid insertion of baits of various sizes and shapes into the bait sleeve through a flexible opening. Once the bait is received within the bait sleeve, it can be retained therein by the compressive sleeve. The shape-defining frame connected to the sleeve provides a shaped support structure, which can prevent excessive compression of the bait by the sleeve.

Although optional embodiments of the invention have been described in detail herein and illustrated in the accompanying drawings, it is to be understood that the invention is not limited to these precise embodiments and that various changes and modifications may be effected therein without departing from the scope of the invention.

The invention claimed is:

1. A bait sleeve for securing a bait therein, the bait sleeve comprising:
    a sleeve comprising:
        a first stretchable ring;
        a plurality of elastomeric bands; and
        a second stretchable ring, the second stretchable ring defining an opening and being stretchable between an open state to receive the bait within the sleeve and a substantially closed state to secure the bait within the sleeve;
    a shape-defining frame for receiving the sleeve thereon, the shape-defining frame extending between a front end provided with the first stretchable ring and a rear end provided with the second stretchable ring,
    the shape-defining frame comprising:
        a first U-shaped metallic wire bent to form a top frame portion and a bottom frame portion; the top frame portion and the bottom frame portion being further bent to form pairs of top and bottom grooves or channels, with the bent top and bottom frame portions substantially enclosing the grooves or channels, each pair of top and bottom grooves or channels are vertically aligned and have one of the elastomeric bands inserted therein;
        a second U-shaped metallic wire bent to form a left frame portion and a right frame portion; and
    the frame being resilient and preventing excessive compression of the bait by the first and second stretchable rings and by the plurality of elastomeric bands; and
    at least one fishing hook operatively connected to the frame.

2. The bail sleeve according to claim 1, wherein bait sleeve has a fish shape.

3. The bait sleeve according to claim 1, wherein the shape-defining frame has a substantially oval shape.

4. The bait sleeve according to claim 1, wherein the first U-shaped metallic wire comprises a central fold at the front end and two extremities opposite the central fold at the rear end.

5. The bait sleeve according to claim 4, wherein the elastomeric bands are rubber elastic bands.

6. The bait sleeve according to claim 5, further comprising a fin provided at or near the top frame portion.

7. The bait sleeve according to claim 6, wherein the fin has an undulated shape.

8. The bait sleeve according to claim 6, wherein at least one of the fin and sleeve is impregnated with fish-attracting odour.

9. The bait sleeve according to claim 6, further comprising a mouth plate provided near the front end, the plate having a curved shaped with a free end and a back end loosely fixed to the shape-defining frame, so as to allow the plate to oscillate.

10. The bait sleeve according to claim 9, comprising a clip for retaining the mouth plate in an inclined position, with the front end of the mouth plate being lower than the rear end.

11. The bait sleeve according to claim 4, further comprising at least one weight provided at or near the bottom of the shape-defining frame.

12. The bait sleeve according to claim 8, further comprising a source of fish-attracting vibrations operatively connected to the bait sleeve.

13. The bait sleeve according to claim 5, wherein the at least one fishing hook is provided at or near the front end.

14. The bait sleeve according to claim 13, further comprising one or more hook rings provided on the bottom and/or top frame portions of the shape-defining frame.

15. The bait sleeve according to claim 14, wherein the at least one fishing hook is connected to the one or more hook rings.

16. The bait sleeve according to claim 5, wherein extremities of the second U-shaped metallic wire are provided with hooks insertable in the bait to maintain the bait in place when in use.

* * * * *